United States Patent

[11] 3,578,337

[72] Inventor Walter F. Klein
    Lexington, Ky.
[21] Appl. No. 777,327
[22] Filed Nov. 20, 1968
[45] Patented May 11, 1971
[73] Assignee International Business Machines
    Corporation
    Armonk, N.Y.

[54] REVERSIBLE DRIVE FOR TRANSDUCER USED IN A RECORDING AND REPRODUCING APPARATUS
8 Claims, 15 Drawing Figs.

[52] U.S. Cl. .................................................... 274/4
[51] Int. Cl. .................................................... G11b 5/02
[50] Field of Search ........................................ 179/100.2;
    274/4, 11

[56] References Cited
UNITED STATES PATENTS

| | | | |
|---|---|---|---|
| 2,648,589 | 8/1953 | Hickman | 179/100.2(T) |
| 2,657,062 | 10/1953 | Meunier | 179/100.2(T) |
| 3,124,360 | 3/1964 | Staar | 274/11X |

*Primary Examiner*—Harry N. Haroian
*Attorneys*—Hanifin and Jancin and Frank C. Leach, Jr.

ABSTRACT: A transducer is driven in reciprocating motion relative to a recording medium for scanning the medium by attaching a band having apertures therein to the transducer. Rotating means has means to engage the apertures in the band to provide positive engagement between the rotating means and the band. The direction of rotation of the rotating means is reversed at each end of scanning by the transducer. The change in direction of rotation of the rotating means is accomplished through a pivotally mounted member that locks a ball retaining member against rotation.

Patented May 11, 1971

INVENTOR.
WALTER F. KLEIN

BY *Frank C. Leach jr.*

ATTORNEY.

3,578,337

1

REVERSIBLE DRIVE FOR TRANSDUCER USED IN A RECORDING AND REPRODUCING APPARATUS

In the copending patent application of William L. Dollenmayer for "Transducer Driving Arrangement For Recording And Reproducing Apparatus," Ser. No. 609,232, filed Jan. 13, 1967, now U.S. Pat. No. 3,471,654, and assigned to the same assignee as the assignee of the present application, there is shown a driving arrangement for causing a transducer to scan a magnetic recording medium. In the aforesaid Dollenmayer application, the transducer is moved for scanning by utilizing a feed screw and reversing the direction of rotation of the feed screw when the transducer reaches each end of its scanning.

The present invention is directed to a drive for moving the transducer for scanning in which a band or flat member is utilized for connection to the transducer rather than the feed screw. Thus, the present invention provides a simpler arrangement for connecting the drive to the transducer while still obtaining a positive drive between the drive means and the transducer.

An object of this invention is to provide a mechanism for driving a transducer to permit scanning of a magnetic recording medium.

Another object of this invention is to provide a reciprocating drive for a transducer in which the direction of motion of the transducer may be rapidly changed.

The foregoing and other objects, features, and advantages of the invention will be more apparent from the following more particular description of the preferred embodiments of the invention as illustrated in the accompanying drawings.

Figure 1:
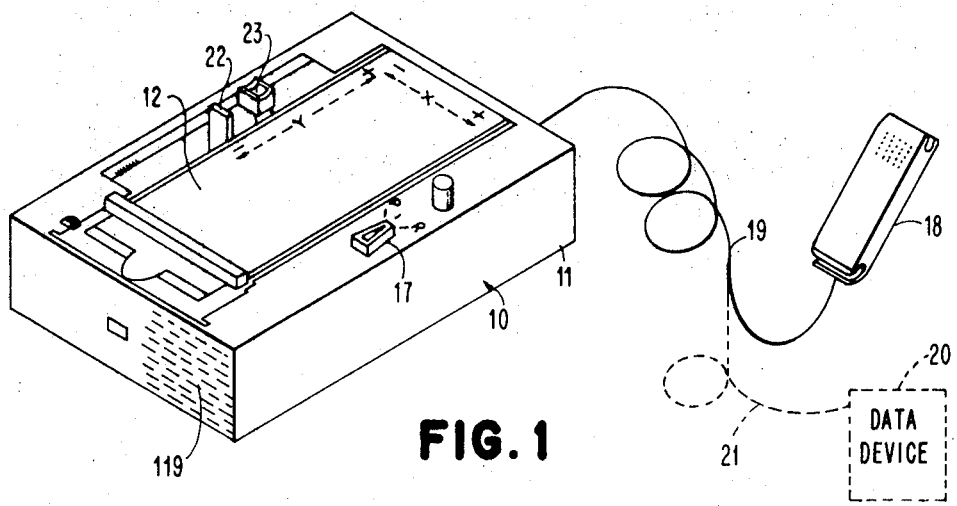
FIG. 1 is a perspective view of a dictating unit having a transducer driven by the drive mechanism of the present invention.
Figure 2:
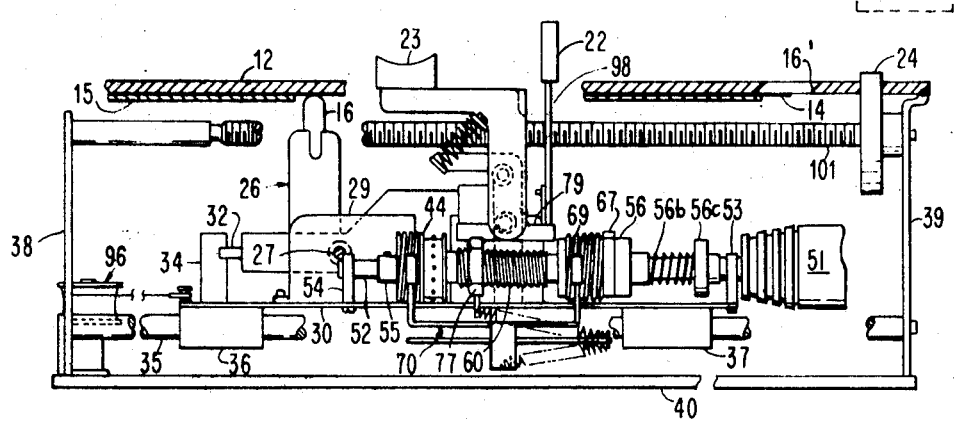
FIG. 2 is a sectional view, partly in elevation, showing portions of drive mechanisms for moving the transducer for scanning purposes.

Referring to the drawings and particularly FIG. 1, there is shown a dictation unit 10 for both recording and reproducing sound as more particularly shown and described in the aforesaid Dollenmayer application. The dictation unit 10 includes a housing 11 having a card retainer 12 on which a magnetic record card 14 of the type more particularly shown and described in the aforesaid Dollenmayer application is supported. The card 14 is supported in the retainer 12 by retaining rails 15 (one shown in FIG. 2) on the bottom side of the retainer 12. The card 14 is disposed within the retainer 12 by being inserted through a slot 16'.

Figure 3:
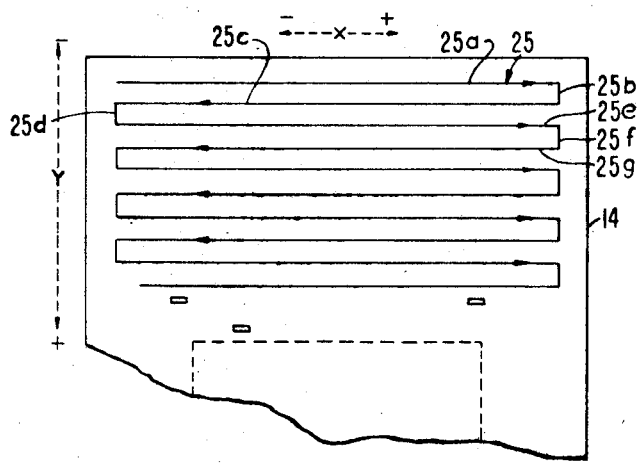
FIG. 3 is a schematic view illustrating the transducer scanning path on an underneath surface of a magnetic record card utilized in the apparatus of FIG. 1.

As shown in FIGS. 1 and 3, the record card 14 is scanned line-by-line by a transducer 16 in alternate opposite directions designated X+ and X−. Stepping of the transducer 16 in another direction is designated Y+ for normal dictation and

2 reproduction of signals and Y− when backstepping occurs as required. Thus, scanning occurs in the X direction and stepping occurs in the Y direction.

Figure 9:
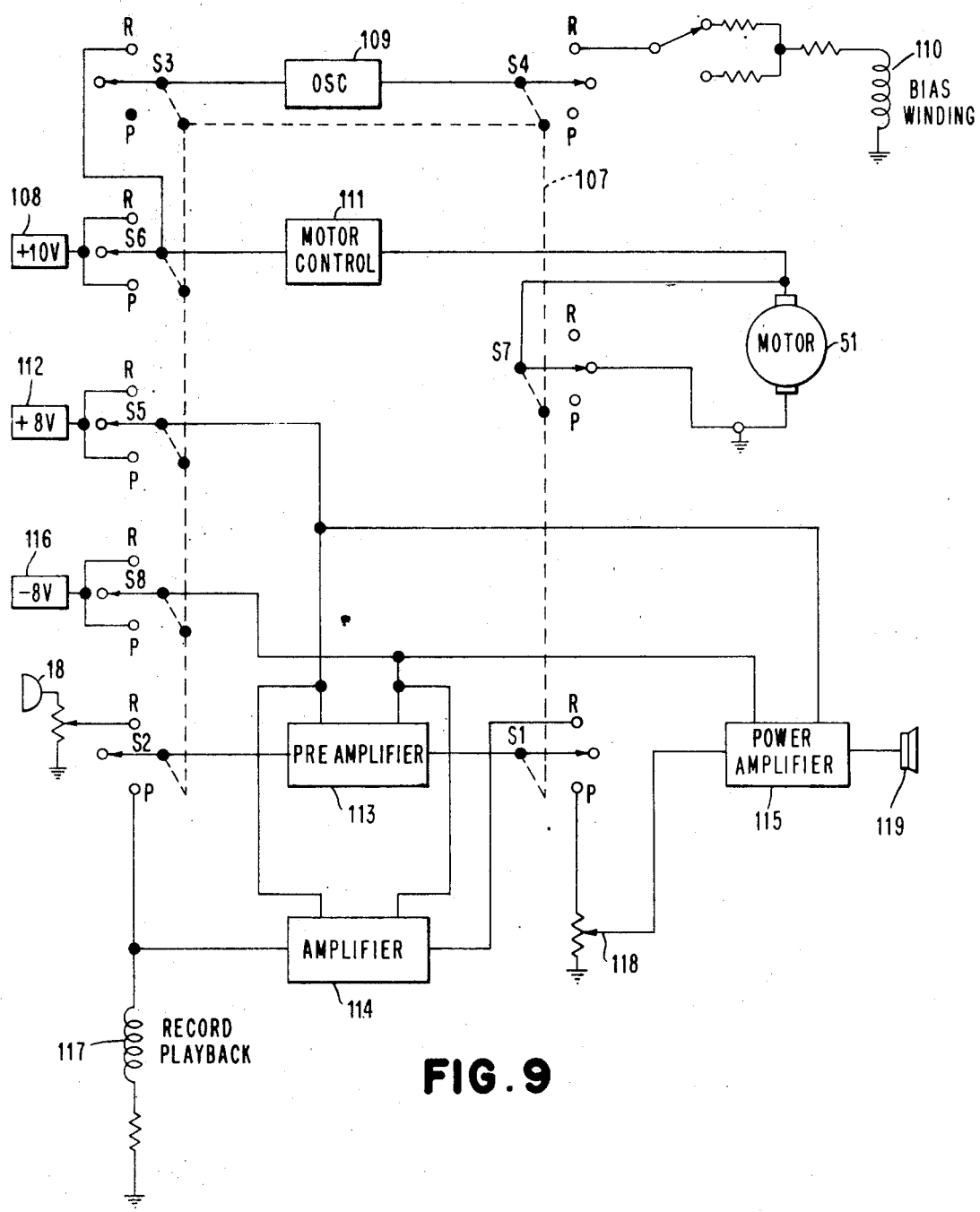
FIG. 9 is a wiring diagram utilized in the apparatus of FIG. 1 for controlling the modes of operation, the drive, and the scanning.

The dictation unit 10 has a mode control knob 17 (see FIG. 1) for positioning its associated switches S1 to S8 (see FIG. 9). The mode control knob 17 has three positions with P indicating the playback mode, R indicating the record mode, and the Off mode being the central position between the P and R indicators.

To record signals, the mode control knob 17 is disposed in the record position and the dictator dictates material into a microphone 18, which is connected to the unit 10 by a cable 19. As an alternative, a data device 20 for supplying and utilizing signals can be connected by a cable 21 to the dictation unit 10 rather than the microphone 18.

The dictation unit 10 has a scanning button 22 and a backspacing button 23. The scanning button 22 permits the operator to scan the transducer 16 with respect to the record card 14 while the backspacing button 23 allows the operator to backstep the transducer 16 with respect to the record card 14. A phasing knob 24 (see FIG. 2) is utilized for fine tuning of the transducer 16 in relation to a recorded track as well as to enable scanning by the transducer 16 in a particular preferred direction with respect to any track on the record card 14.

Referring to FIG. 3, there is shown a typical path 25, which is traced by the transducer 16 on the underneath surface of the record card 14. The path 25 has a number of portions such as 25a —25g, for example. The portions 25a, 25c, 25e, and 25g are produced by scanning in the X direction while the portions 25b, 25d, and 25f are the result of stepping of the transducer 25 in the Y+ direction.

The transducer 16 is part of a transducer assembly 26 (see FIG. 4), which is adapted to be movable in the X direction by movement along a guide rod 27, which has its opposite ends supported in blocks 28 and 29 on a plate 30 of a carrier 31. The transducer assembly 26 also has a projecting portion 32, which rides in a track 33 in a block 34. The block 34 also is mounted on the carrier plate 30.

Figure 4:
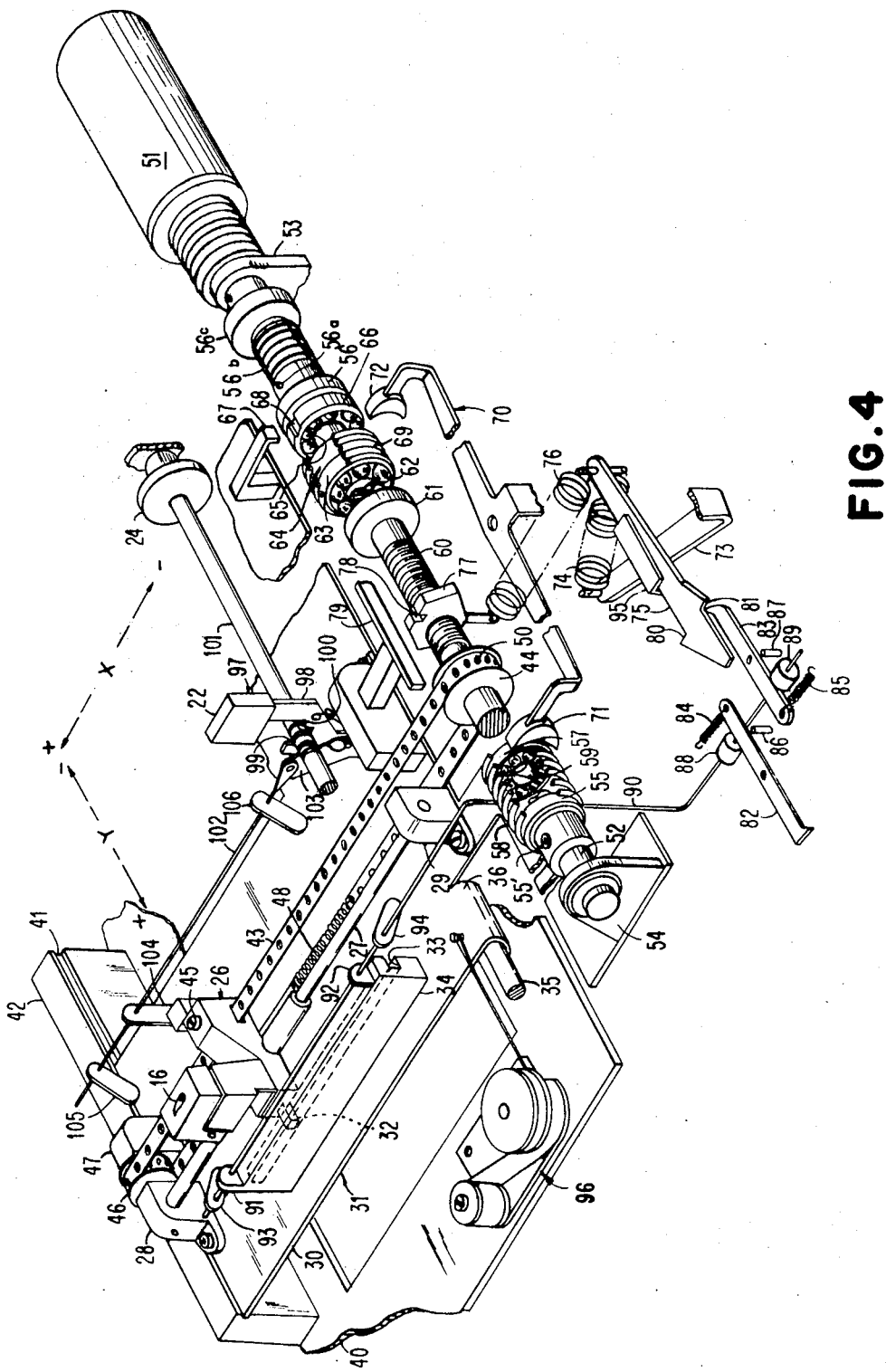
FIG. 4 is an enlarged perspective view showing one embodiment of the mechanism for driving the transducer in reciprocating motion to scan the magnetic record card.

The carrier 31 is adapted to be moved in the Y direction by sliding along a guide rod 35. The carrier 31 has the plate 30 formed with portions 36 and 37 (see FIG. 2) mounted on the guide rod 35, which is supported at its opposite ends by upstanding supports 38 and 39 on base 40 of the dictation unit 10. As shown in FIG. 4, the plate 30 has the side opposite from the portions 36 and 37 disposed in a track 41, which is formed in a block 42 supported on the base 40.

Accordingly, the transducer 16 is movable in the X direction by sliding along the guide rod 27 in cooperation with the track 33. The transducer 16 is movable in the Y direction by sliding along the guide rod 35 in cooperation with the track 41.

The transducer 16 is movable in the X direction by a flexible band 43 being driven in a linear direction from a rotating pulley 44. The band 43 is secured to the transducer assembly 26 by a screw 45. The band 43 passes around a pulley 46, which is supported by the block 28 and block 47. The block 47 is supported on the plate 30. The free ends of the band 43 are connected to each other by a spring 48, which takes up any slack in the band 43.

The band 43 has apertures therein into which extending pins 50 on the pulley 44 project to produce a positive driving engagement between the driven pulley 44 and the band 43. With this positive driving engagement between the pulley 44 and the band 43, precise positioning of the transducer 16 is obtained.

The pulley 44 is adapted to be driven by a motor 51, which has its shaft 52 rotatably supported by a pair of lugs 53 and 54. The lugs 53 and 54 extend upwardly from the plate 30 on which they are supported. The pulley 44 is rotatably mounted on the shaft 52 of the motor 51.

The shaft 52 has a pair of thrust bearing components 55 and 56 secured thereto for rotation therewith and disposed on opposite sides of the pulley 44. The component 55 is fixed to the shaft 52 by a screw 55' while the component 56 is slidably mounted on the shaft 52 through having a pin 56a disposed in a longitudinal slot (not shown) in the shaft 52. The component 56 is continuously urged toward the component 55 by a spring 56b, which has one end bearing against the component 56 and its other end bearing against a hub 56c. The hub 56c is fixedly secured to the shaft 52.

Figure 5:
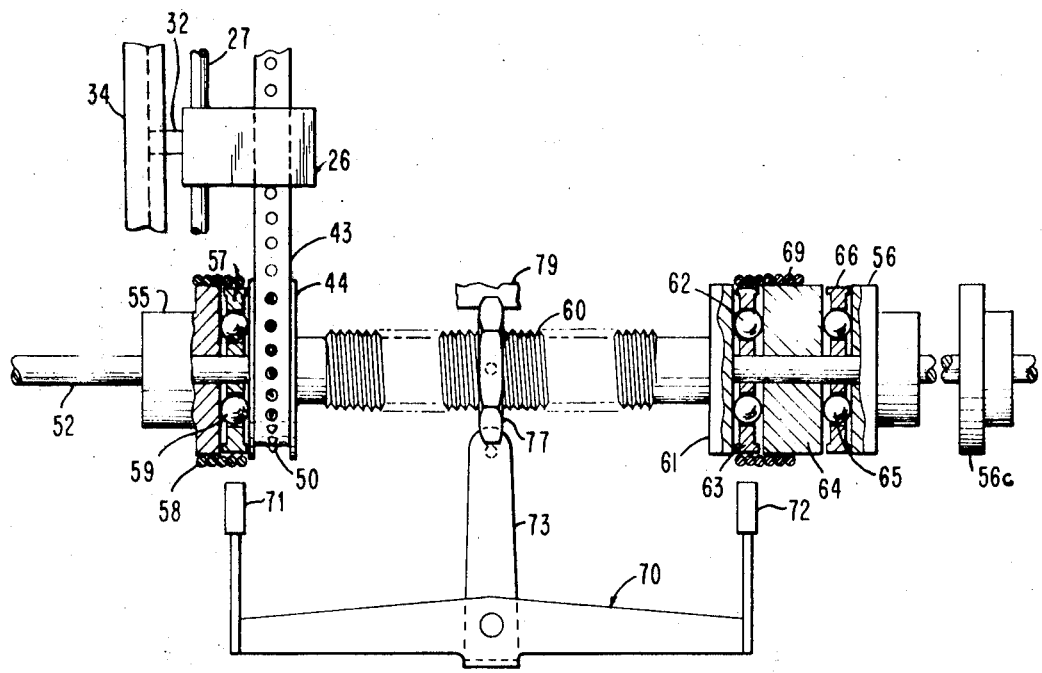
FIG. 5 is an enlarged top plan view of a portion of the drive mechanism of FIG. 4 and showing a portion of the mechanism when driving of the transducer is being reversed.

A ball retainer 57, which has an outer diameter slightly smaller than the thrust bearing component 55 as shown in FIG. 5, is disposed between the thrust bearing component 55 and one side of the pulley 44. A spring 58, which is wound on the thrust bearing component 55, also surrounds the ball retaining member 57, which has balls 59 therein in contact with both the component 55 and the pulley 44.

When the spring 58 is urged against the ball retaining member 57, the ball retaining member 57 rotates with the component 55 so that the component 55 and the pulley 44 rotate in the same direction. This is because the balls 59 do not rotate when the ball retaining member 57 rotates.

The pulley 44 has a threaded portion 60 formed integral therewith and extending from the opposite side of the pulley 44 to that on which the ball retaining member 57 is disposed. The threaded portion 60 has an annular portion 61 formed on its end thereof and against which balls 62 in a ball retaining member 63 bear.

The opposite side of the ball retaining member 63 has a thrust bearing component 64 adjacent thereto and in contact with the balls 62. The opposite side of the component 64 has balls 65 in a ball retaining member 66 in engagement therewith. The other side of the ball retaining member 66 is adjacent to the thrust bearing component 56, which is urged into engagement with the balls 65 in the ball retaining member 66 by the spring 56b.

The ball retaining member 66 is fixed against rotational movement by a member 67, which is fixed to the carrier 31 for movement therewith and disposed in a slot 68 in the ball retaining member 66. Thus, the ball retaining member 66 is always prevented from rotating. Accordingly, the balls 65 in the ball retaining member 66 function to cause the thrust bearing component 64 to rotate in the opposite direction from the thrust bearing component 56.

A spring 69 is wound around the component 64 and also surrounds the ball retaining member 63, which has an outer diameter slightly smaller than the component 64 as shown in FIG. 5. Accordingly, when the spring 69 engages with the ball retaining member 63, the ball retaining member 63 rotates with the component 64. As a result, the pulley 44 rotates in the opposite direction to the shaft 52 since the ball retaining member 63 rotates in the same direction as the component 64. When this occurs, the ball retaining member 57 is not engaged by the spring 58 so that the balls 59 rotate as the component 55 and the pulley 44 are moving in opposite directions.

Accordingly, when the spring 69 is held against the ball retaining member 63, the pulley 44 is rotated in the opposite direction to the rotation of the shaft 52 of the motor 51. However, when the spring 58 is held against the ball retaining member 57, the pulley 44 rotates in the same direction as the shaft 52 of the motor 51 rotates. Therefore, by causing only one of the ball retaining members 57 and 63 to rotate with the adjacent component, the direction of rotation of the pulley 44 is readily controlled.

An arm 70, which is pivotally mounted on the carrier 31, has shoes 71 and 72 on opposite ends thereof for cooperation with the ball retaining members 57 and 63, respectively. Thus, when the arm 70 is pivoted clockwise to bring the shoe 71 into engagement with the spring 58, the ball retaining member 57 rotates with the component 55 whereby the pulley 44 is rotated in the same direction as the shaft 52 of the motor 51. When the arm 70 is pivoted in the opposite (counterclockwise) direction, the shoe 72 engages the spring 69 to cause the ball retaining member 63 to rotate with the component 64 whereby the pulley 44 is rotated in the opposite direction to that of the shaft 52 of the motor 51. The position of the pivotally mounted arm 70 is controlled in accordance with the position of the transducer assembly 26.

The pivotally mounted arm 70 has a finger 73 to which one end of a spring 74 (see FIG. 4) is attached. The other end of the spring 74 is connected to a slider 75, which has a second spring 76 attached to the same end thereof as the spring 74. The other end of the spring 76 is attached to a nut 77, which is mounted on the threaded portion 60 of the pulley 44. The nut 77 has a slot 78 formed therein for cooperation with a member 79, which is fixed to the carrier 31, to prevent rotation of the nut 77 when the threaded portion 60 rotates. This results in axial movement of the nut 77. Thus, the direction of the force exerted by the spring 76 is varied due to movement of the nut 77.

The other end of the slider 75 has a pair of stops or shoulders 80 and 81 formed therein. A latch 82, which is pivotally mounted on the carrier 31, is adapted to engage the stop 80 on the slider 75 while a latch 83, which also is pivotally mounted on the carrier 31, is adapted to engage the stop 81 on the slider 75.

A spring 84 continuously urges the latch 82 counterclockwise while a spring 85 continuously urges the latch 83 counterclockwise. Thus, both of the latches are continuously urged into latching engagement with the slider 75.

A stop 86, which is supported by the carrier 31, limits the counterclockwise motion of the latch 82 by the spring 84. Likewise, a stop 87, which is mounted on the carrier 31, limits the counterclockwise movement of the latch 83 by the spring 85.

The positions of the latches 82 and 83 are controlled by a pair of plugs 88 and 89, which are fixedly mounted on a link 90. The link 90 is slidably mounted in ears 91 and 92 on the block 34. The link 90 has a pair of arms 93 and 94 fixedly mounted thereon for engagement by a portion of the transducer assembly 26 during its movements in the X direction.

As shown in FIG. 4, the transducer assembly 26 is moving towards the arm 93 due to the pulley 44 rotating counterclockwise. It should be understood that the motor 51 is considered to rotate counterclockwise.

Accordingly, when the transducer assembly 26 engages the arm 93, the plug 89 causes clockwise pivoting of the latch 83 against the force of the spring 85 to remove the latch 83 from engagement with the stop 81 on the slider 75. When this occurs, the slider 75 is no longer latched against movement by the latch 83.

Figure 6A:
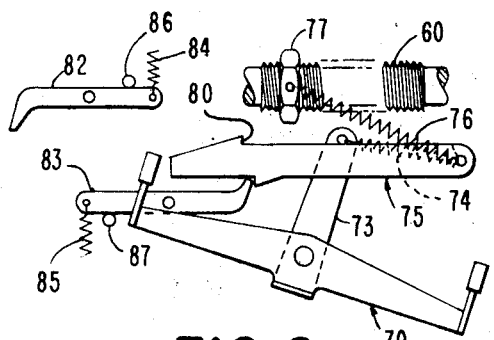
FIGS. 6a and 6d are schematic plan views showing relationships of various parts of the driving mechanism during scanning of the record card in the apparatus of FIG. 1.

At this time, the nut 77 will have been advanced along the threaded portion 60 to its position closest to the pulley 44. This also is shown in FIG. 6a. With the nut 77 in this position, the movement of the latch 83 by the plug 89 to release the latch 83 from holding the slider 75 results in the spring 76, which connects the nut 77 to the slider 75, moving the slider 75 to the left (as viewed in FIGS. 6a—6d).

Figure 6C:
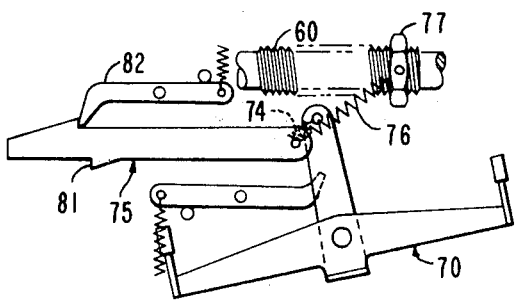
Figure 6B:
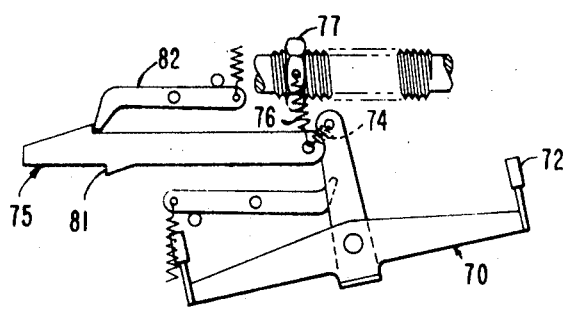
Figure 6D:
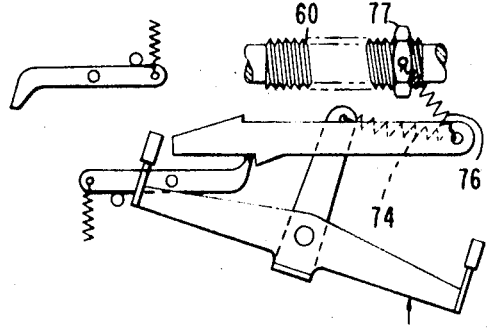

After the slider 75 is moved by the spring 76, the direction of the force of the spring 74 is changed so that it causes counterclockwise rotation of the arm 70 from the position of FIG. 6a to the position of FIG. 6b. The intermediate position between FIG. 6a and FIG. 6b is shown in FIG. 5 wherein neither of the shoes 71 and 72 is in engagement with the spring with which it cooperates. The movement of the slider 75 by the spring 76 is guided by a guide 95 (see FIG. 4), which is mounted on the carrier 31. The amount of movement of the slider 75 to the left (as viewed in FIGS. 6a—6d) is such that the stop 80 on the slider 75 will be disposed so that the latch 82 may engage thereagainst as shown in FIG. 6b.

When the shoe 72 is moved into engagement with the spring 69, the direction of rotation of the pulley 44 is reversed. As a result, the transducer assembly 26 moves along the guide rod 27 toward the arm 94; this is the X− direction.

As the pulley 44 is rotated clockwise due to the spring 69 engaging the ball retaining member 63 because of the shoe 72 engaging the spring 69, the nut 77 advances away from the pulley 44 toward the annular portion 61. As shown in FIG. 6c, this changes the direction of force of the spring 76 so that the slider 75 is urged to the right. However, as long as the latch 82 is engaging the stop 80 on the slider 75, the spring 76 cannot move the slider 75 to the right.

When the transducer assembly 26 engages the arm 94 on the link 90, the link 90 moves the plug 88 against the latch 82 with sufficient force to overcome the force of the spring 84 and release the slider 75 for movement in response to the force of the spring 76. When this occurs, the spring 76 moves the slider 75 to the right from the position of FIG. 6c to the position of FIG. 6d. This results in the direction of the force of the spring 74 being changed so that it causes the arm 70 to pivot clockwise. This removes the shoe 72 from engagement with the spring 69 and moves the shoe 71 so as to cause the spring 58 to engage the ball retaining member 57. As a result, the direction of rotation of the pulley 44 is again reversed.

Thus, as the transducer 16 completes its scanning in one direction, the drive mechanism of the present invention is automatically reversed to cause the transducer 16 to move in the opposite direction for scanning. Of course, when the transducer 16 is reversed for scanning in the opposite direction, there also must be stepping of the transducer 16 in the Y direction so that the transducer 16 does not scan the same material as it scanned during its previous movement. Accordingly, the carrier 31 is utilized to perform the stepping of the transducer 16 after each of its scanning operations.

The stepping of the transducer 16 in the Y± direction is accomplished by the stepping mechanism shown and described in the aforesaid Dollenmayer application. This mechanism includes a spring motor assembly 96 for exerting a pull on the carrier plate 30 in the Y+ direction and being under control of a spacing mechanism 97, which includes the scanning button 22.

The scanning button 22 is mounted on a stem 98, which is pivotally mounted on the carrier plate 30 in the manner more specifically shown and described in the aforesaid Dollenmayer application. The stem 98 has teeth 99 and 100 formed therein and disposed on opposite sides of a lead screw 101, which is supported in bearings on the upstanding supports 38 and 39. The lead screw 101 has a predetermined threaded configuration whereby the extent of each incremental movement of the carrier 31 in the Y direction is precisely controlled.

An escapement link 102 is pivotally connected to an extension 103 of the stem 98. The link 102 is mounted for sliding movement in an aperture of a support 104 on the carrier plate 30.

The link 102 has a pair of arms 105 and 106 extending downwardly therefrom for engagement by the transducer assembly 26 at completion of each of the scanning motions of the transducer 16. Thus, the arm 105 is engaged by the transducer assembly 26 when the arm 93 on the link 90 is engaged by the transducer assembly 26. Likewise, the arm 106 is engaged by the transducer assembly 26 when the arm 94 on the link 90 is engaged by the transducer assembly 26. Thus, each time that the direction of scanning motion of the transducer 16 is to be reversed, one of the arms 105 and 106 also is engaged to cause one of the teeth 99 and 100 to move out of engagement with the lead screw 101 and the other of the teeth 99 and 100 to move into engagement with the lead screw 101 whereby the spring motor assembly 96 causes movements of the carrier 31 in the Y+ direction in the manner more specifically shown and described in the aforesaid Dollenmayer application.

As previously mentioned, the dictation unit 10 also has the backspacing button 23. The specific operation of the backspacing button 23 is the same as that more specifically shown and described in the aforesaid Dollenmayer application and will not be described herein.

Considering the operation of the present invention in which the drive mechanism of FIGS. 4, 5, and 6a—6d is utilized for moving the transducer 16 in the X direction, recording is accomplished when the knob 17 is positioned in its record (R) position of FIG. 1. In this position, each of the switches S1 to S8 (see FIG. 9) is moved to its upper position, which is the record (R) position.

In this position of the switches S1 to S8, which are interconnected with each other as indicated by dash line 107 in FIG. 9, power is supplied from a positive potential source 108 to an oscillator 109 through the switches S6, S3, and S4. As a result, the oscillator 109 supplies a desired AC bias to a bias winding 110 of the transducer 16. The voltage from the potential source 108 also is supplied to the motor 51 through a motor control 111. As a result, the transducer 16 is moved in the X direction to scan the magnetic record card 14, which is positioned in the retainer 12.

A second positive potential source 112 is connected by the switch S5 to a preamplifier stage 113, an amplifier stage 114, and a power amplifier stage 115. A negative potential source 116 is connected through the switch S8 to the preamplifier stage 113, the amplifier stage 114, and the power amplifier stage 115.

With the switches S1 and S2 in their record (R) positions, signals directed to the microphone 18 are supplied to a record-playback winding 117 of the transducer 16. As a result, the signals directed to the microphone 18 are recorded by the transducer 16 on the magnetic record card 14 as the transducer 16 is moved in the X direction. The starting and stopping of the machine during recording is accomplished through moving the knob 17 between its record and off positions.

In a playback operation, each of the switches S1 to S8 is in its lower playback (P) position. This is accomplished through movement of the knob 17 to its playback (P) position.

In playback, the oscillator 109 is ineffective due to the position of the switch S3. However, the motor 51 continues to be energized from the positive potential source 108. Likewise, the voltage sources 112 and 116 are connected to the amplifier stages 113—115.

During playback, signals generated in the record-playback winding 117 as the transducer 16 scans the record card 14 are supplied through the switch S2 to the preamplifier stage 113. The output of the preamplifier stage 113 is directed through the switch S1, a volume control 118, and the power amplifier stage 115 and applied as an audio signal to a speaker 119.

When the motor 51 is energized, motion of the transducer 16 in the X direction automatically starts. The direction of motion motion of the transducer 16 in the X direction depends on whether the shoe 17 or the shoe 72 is in the position in which it engages the spring and retaining member with which it cooperates. As shown in FIG. 4, the shoe 71 is engaging the spring 58 to urge it into contact with the ball retaining member 57. With the spring 58 engaging the ball retaining member 57, the pulley 44 is rotated in the same direction as the motor 51, which rotates counterclockwise. As a result, the pulley 44 drives the transducer 16 in the X+ direction.

When the transducer assembly 26 engages the arm 93 on the link 90, the plug 89 causes the latch 83 to cease to hold the slider 75 whereby the force of the spring 76, due to the position of the nut 77, moves the slider 75 to the left (as viewed in FIGS. 6a—6d) in the guide 95. This results in the shoe 72 being moved into engagement with the spring 69 to cause the spring 69 to engage the ball retaining member 63. This causes the ball retaining member 63 to rotate in the same direction as the component 64, which rotates clockwise or in the opposite direction to that of the motor shaft 52. When this occurs, the pulley 44 rotates in the opposite direction to the shaft 52.

When the transducer assembly 6 engaged the arm 93 on the link 90, another portion of the transducer assembly 26 engaged the arm 105 on the link 102. As a result, the carrier 31 was advanced in the Y+ direction due to the force exerted by the spring motor assembly 96 during the time that the tooth 99 was removed from engagement with the lead screw 101 until the tooth 100 was moved into engagement with the lead screw 101 by the link 102.

Upon completion of motion of the transducer 16 in the S— direction, the arm 94 on the link 90 is engaged to cause the latch 82 to be removed by the plug 88 from latching engagement with the slider 75. As a result, the slider 75 is moved to the right (as viewed in FIGS. 6a—6d) by the spring 76 due to the position of the nut 77. It will be noted that the nut 77 moved from the position of FIG. 6b to the position of FIG. 6c during advancement of the transducer 16 in the S— direction.

Thus, the actuation of the arm 94 by the transducer assembly 26 results in the shoe 72 being removed from engagement with the spring 69 and the shoe 70 returned into engagement with the spring 58. This results in the direction of rotation of the pulley 44 again being reversed to cause the transducer 16 to again move in the X+ direction.

Of course, when the arm 94 is engaged by the transducer assembly 26, the arm 106 also is engaged by the transducer assembly 26. As a result, the tooth 100 on the stem 98 is removed from engagement with the lead screw 101 and the tooth 99 is moved into engagement with the lead screw 101. However, during the time that the teeth 99 and 100 are not in engagement with the lead screw 101, the carrier 31 is advanced by the spring motor assembly 96 in the Y+ direction for the desired distance of the step.

Thus, during either record or playback, each completion of a scanning motion in one of the X directions results in reversal of the drive of the transducer assembly 26 along with stepping of the transducer assembly 26 for the desired stepping distance. As set forth in the aforesaid Dollenmayer application, this is determined by the threaded configuration of the lead screw 101.

Referring to FIGS. 7 and 8a—8d, there is shown another embodiment of the mechanism for driving the transducer 16 in the X direction to scan the magnetic record card 14. The drive arrangement is substantially similar to that of the embodiment of FIGS. 4, 5, and 6a—6d. However, a ball retaining member 120 has been substituted for the ball retaining member 57 and the spring 58 has been omitted. Furthermore, the ball retaining member 120 has a larger outer diameter than the bearing component 55.

The ball retaining member 63 has been replaced by a ball retaining member 121, and the spring 69 has been omitted. The outer diameter of the ball retaining member 121 is larger than the outer diameter of the component 64.

Figure 7:
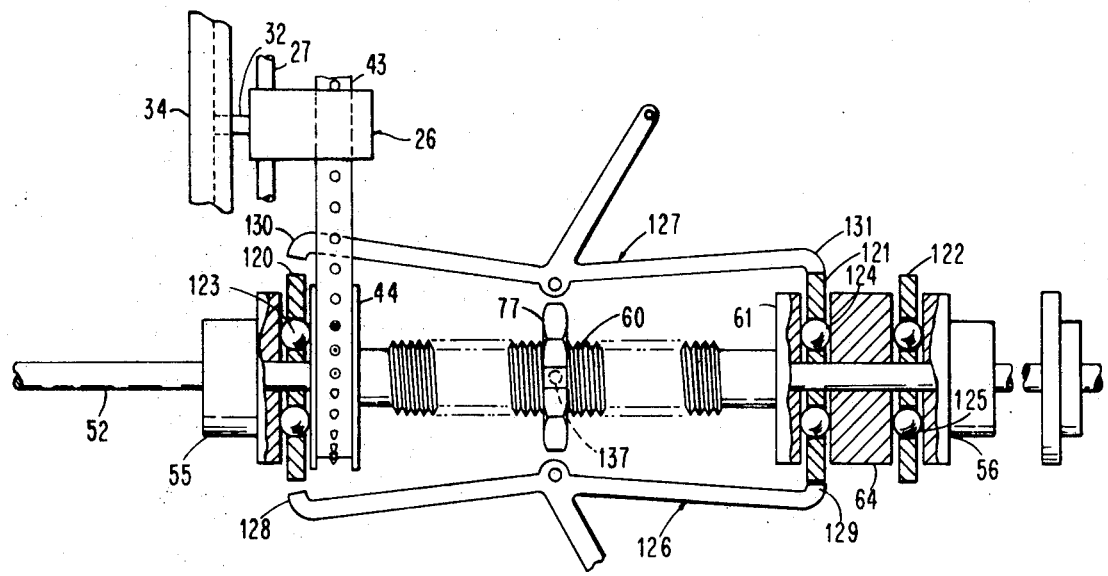
FIG. 7 is a top plan view of a portion of another embodiment of the mechanism for reciprocating the transducer and showing the portion of the mechanism in a position in which the direction of motion of the transducer is being reversed.

The other change in the drive mechanism of the modification of FIGS. 7 and 8a—8d from the embodiment of FIGS. 4, 5, and 6a—6d is the substitution of a ball retaining member 122 for the ball retaining member 66. The ball retaining member 122 has a slot therein the same manner as the slot 68 to receive the member 67 to prevent rotation of the ball retaining member 122. The ball retaining member 122 has a larger outer diameter than the component 56 as shown in FIG. 7.

The mechanism for changing the direction of rotation of the pulley 44 is completely different from that shown in FIGS. 4, 5, and 6a—6d. The mechanism of this embodiment depends upon positively locking the retaining member 120 or the retaining member 121 against rotation.

Accordingly, if the shaft 52 is deemed to be rotating counterclockwise, the holding of the ball retaining member 120 results in the pulley 44 being driven in the opposite direction to the shaft 52 or in a clockwise direction. This is because balls 123 in the ball retaining member 120 rotate since the ball retaining member 120 is locked. This causes rotation of the pulley 44 in the opposite direction to that of the component 55.

Likewise, when the ball retaining member 121 is held against rotation, the pulley 44 is rotated in the same direction as the shaft 52. This is because balls 124 in the ball retaining member 121 rotate when the ball retaining member 121 is locked. As a result, this reverses the direction of rotation of the pulley 44 so that it is opposite to that of the rotation of the component 64. Because the ball retaining member 122 is held against rotation by the member 67, balls 125 in the ball retaining member 122 cause the component 64 to be rotated in the opposite direction to the motor shaft 52. Therefore, when the ball retaining member 121 is held against rotation, the pulley 44 rotates in the same direction as the shaft 52.

The mechanism for holding the ball retaining members 120 and 121 against rotation includes a pair of pivotally mounted arms 126 and 127. The pivotally mounted arm 126 has shoes 128 and 129 for engagement with the ball retaining members 120 and 121, respectively. The pivotally mounted arm 127 has shoes 130 and 131 for engagement with the ball retaining members 120 and 121, respectively. The arms 126 and 127 must be pivoted together so that the shoes 128 and 130 simultaneously engage the ball retaining member 120 to clamp it against rotation and the shoes 129 and 131 simultaneously contact the ball retaining member 121 to prevent it from rotating.

The mechanism for changing the positions of the pivotally mounted arms 126 and 127 includes a slider 132 having flanges 133 and 134 thereon. A rod 135 extends through openings in the flanges 133 and 134 and has a hub or collar 136 fixedly connected thereto. The collar 136 also is connected to the nut 77 on the threaded portion 60 of the pulley 44 for movement therewith by a pin 137. Thus, the collar 136 follows the axial movement of the nut 77.

A spring 138 is disposed between the flange 133 on the slider 132 and the collar 136 and surrounds the rod 135. A second spring 139 is disposed between the flange 134 on the slider 132 and the collar 136 and surrounds the rod 135.

The rod 135 is slidably supported by a pair of stops 140 and 141, which are mounted on the carrier 31. The stops 140 and 141 serve to limit the movement of the slider 132 along the rod 135 in addition to guiding the rod 135.

Movement of the slider to the left (as viewed in FIGS. 8a—8d) is limited by a pivotally mounted latch 142 engaging a stop or shoulder 143 on the slider 132. The latch 142 is continuously biased into engagement with the stop 143 by a spring 144. The counterclockwise rotation of the latch 142 by the spring 144 is limited by a stop 145, which is supported on the carrier 31 as is the latch 142.

Movement of the slider 132 to the right is limited by a latch 146, which is on the carrier 31 and engages against a stop or shoulder 147 on the slider 132. A spring 148 continuously biases the latch 146 clockwise into engagement with the stop 147 on the slider 132. The movement of the latch 146 by the spring 148 is limited by a stop 149, which is mounted on the carrier 31.

Figures 8A, 8B:
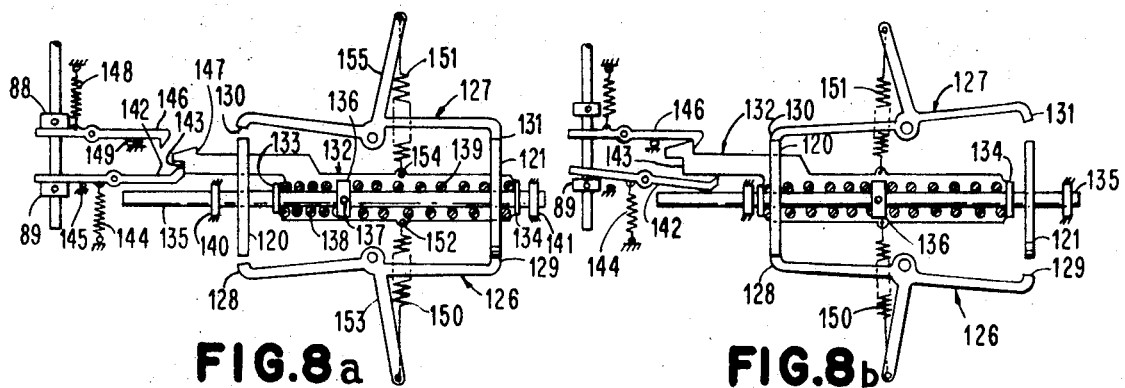
FIGS. 8a to 8d are schematic plan views showing the relationship of other parts of the mechanism of FIG. 7 in which the transducer is moved to scan the magnetic record card.

When the arms 126 and 127 are in the position of FIGS. 7 and 8a, the ball retaining member 121 is locked against rotation. As a result, the transducer 16 is moving in the X+ direction since the pulley 44 is rotating in the same direction as the motor shaft 52.

In this position, the slider 132 is prevented from moving to the left due to the latch 142 engaging against the stop 143 on the slider 132. As the pulley 44 continues to rotate counterclockwise, the nut 77 advances toward the pulley 44 and away from the annular portion 61. This causes the collar 136 to be advanced along the rod 135 to compress the spring 138 between the collar 136 and the flange 133 on the slider 132 because the slider 132 is held against movement to the left by the latch 142.

When the transducer 16 completes its movement in the X+ direction, the arm 93 is engaged by the transducer assembly 26. This results in the plug 89 engaging the latch 142 to pivot it clockwise against the force of the spring 144. As a result, the latch 142 is removed from engagement with the stop 143 on the slider 132.

When this occurs, the spring 138, which has been compressed, urges the slider 132 to the left through acting on the flange 133. The movement of the slider 132 to the left is limited by the force of the compressed spring 138 and the stop 140. Normally, the force of the spring 138 is not sufficient to move the slider 132 into engagement with the stop 140.

When the slider 132 moves to the left, it changes the direction of the force on each of springs 150 and 151. The spring 150 is connected between an ear 152 on the slider 132 and a finger 153 on the pivotally mounted arm 126. The spring 151 is connected between an ear 154 on the slider 132 and a finger 155 on the pivotally mounted arm 127.

Thus, when the slider 132 moves to the left from the position of FIG. 8a to the position of FIG. 8b, the spring 150 causes clockwise pivoting of the arm 126 and the spring 151 causes counterclockwise movement of the arm 127. As a result, the shoes 129 and 131 are removed from engagement with the ball retaining member 121 and the shoes 128 and 130 are moved into contact with the ball retaining member 120. When this occurs, the pulley 44 is driven clockwise to cause the transducer 16 to scan in the X- direction.

Of course, during the time that the arms 126 and 127 are pivoting from the position of FIG. 8a to the position of FIG. 8b, the carrier 31 is being stepped in the Y+ direction the required distance. This is accomplished in the same manner as previously described for the embodiment of FIGS. 4, 5, and 6a—6d.

When the ball retaining member 120 is prevented from rotating, the pulley 44 rotates clockwise to advance the nut 77 toward the annular portion 61. As a result, the collar 136 on the rod 135 is moved toward the flange 134 of the slider 132. The slider 132 is prevented from moving by the latch 146 engaging the stop 147 on the slider 132. As the pulley 44 continues to rotate clockwise, the spring 139 is compressed by the collar 136 as illustrated in FIG. 8c.

When the transducer 16 completes its movement in the X- direction, the arm 94 on the link 90 is engaged by the transducer assembly 26 to move the plug 88 sufficiently to cause the latch 146 to be pivoted counterclockwise against the force of the spring 148 whereby the latch 146 ceases to prevent the slider 132 from moving to the right. When the latch 146 releases the slider 132, the compressed spring 139 moves the slider 132 to the right. The movement of the slider 132 to the right is limited by the force of the compressed spring 139 and the stop 141. Normally, the force of the spring 139 due to its compression is not sufficient to move the slider 132 into engagement with the stop 141.

Figures 8C, 8D:
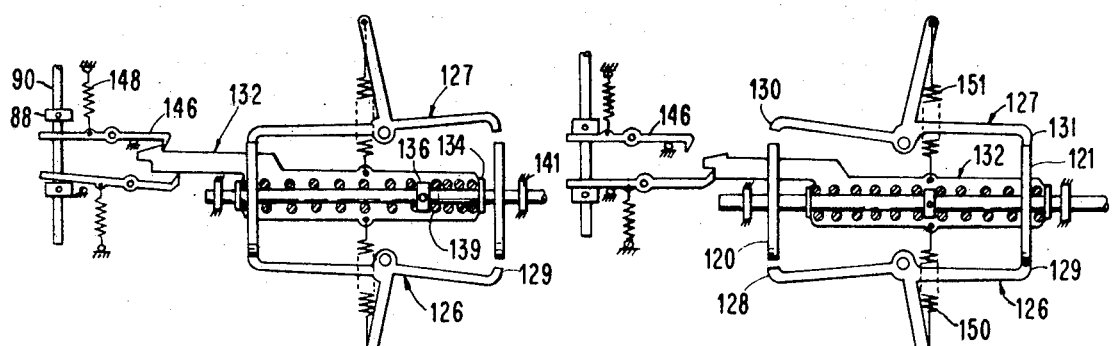

When the slider 132 is released by the latch 146, it moves to the position of FIG. 8d. When this occurs, the direction of the force of the springs 150 and 151 on the pivotally mounted arms 126 and 127 is changed. As a result, the arm 126 is pivoted counterclockwise by the spring 150 and the arm 127 is pivoted clockwise by the spring 151. This results in the shoes 129 and 131 again engaging the ball retaining member 121 to prevent its rotation while the shoes 128 and 130 are removed from contact with the ball retaining member 120. Accordingly, the pulley 44 is now again rotated counterclockwise to again advance the transducer 16 in the X+ direction. This causes the collar 136 to be advanced to the left and compress the spring 138 until the position of FIG. 8a is again reached.

Considering the operation of the dictation unit 10 with the transducer scanning mechanism of the modification of FIGS. 7 and 8a—8d, the pulley 44 will be assumed to be rotating counterclockwise due to the ball retaining member 121 being held against rotation. Thus, the balls 124 in the ball retaining member 121 reverse the direction of rotation of the pulley 44 with respect to the component 64. Since the component 64 is rotated in the opposite direction to the motor shaft 52, the pulley 44 rotates in the same direction as the shaft 52. Thus, the pulley 44 rotates counterclockwise to move the transducer 16 in the X+ direction.

Upon completion of movement in the X+ direction, the arm 93 is engaged by the transducer assembly 26 whereby the latch 142 is released from holding the slider 132 by the plug 89. When this occurs, the force of the spring 138, which has been compressed by the collar 136 being moved by the nut 77 as the pulley 44 rotated counterclockwise, is moved to the left to change the direction of force of the change 150 and 151. At this time, the arm 105 on the link 102 has been actuated by the transducer assembly 26 to cause stepping in the Y+ direction of the carrier 31. Of course, the carrier 31 carries all of the mechanism of the modification of FIGS. 7 and 8a—8d in the same manner as it carries all of the structure of the embodiment of FIGS. 4, 5, and 6a—6d.

When the ball retaining member 120 is locked against rotation by the pivotally mounted arms 126 and 127, the direction of rotation of the pulley 44 is reversed so that the transducer 16 is now moved in the X- direction due to the pulley 44 rotating clockwise. With the pulley 44 rotating clockwise, the nut 77 moves toward the annular portion 61 so that the collar 136 moves to compress the spring 139 since the slider 132 is retained against movement to the right by the latch 146.

When movement of the transducer 16 in the X- scanning direction is completed, the arm 94 is actuated to release the latch 146 from holding the slider 132. As a result, the slider 132 is moved to the right to change the direction of force of the springs 150 and 151 whereby the ball retaining member 120 is now released and the ball retaining member 121 is locked against rotation.

When the transducer assembly 26 completed its movement in the X- direction, it not only engaged the arm 94 but it also engaged the arm 106 on the link 102. This resulted in the carrier 31 being stepped in the Y+ direction.

An advantage of this invention is that there is zero clearance in a mechanism for driving a transducer in the scanning directions whereby positive positioning of the transducer is obtained. Another advantage of this invention is that it is relatively simple, compact, and inexpensive.

While the invention has been particularly shown and described with reference to preferred embodiments thereof, it will be understood by those skilled in the art that the foregoing and other changes in form and details may be made therein without departing from the spirit and scope of the invention.

I claim:

1. Apparatus for scanning a medium in a plurality of alternate directions including:
   transducer means;
   means for retaining the medium adjacent said transducer means for scanning;
   linear moving means attached to said transducer means, said linear moving means being movable in a first direction to drive said transducer means in one direction and movable in a second direction to drive said transducer means in another direction;
   rotatable means connected to said linear moving means to drive said linear moving means in the first and second directions;
   means to change the direction of rotation of said rotatable means when said transducer means completes movement in said one direction and is ready for movement in said another direction and vice versa;
   and means to step one of said transducer means and the medium relative to the other in a direction at an angle to the scanning directions at either end of movement of said transducer means in the scanning directions.

2. The apparatus according to claim 1 including:
   motive means;
   a shaft connected to said motive means and rotated in only one direction;
   first means to connect said shaft to said rotatable means to rotate said rotatable means in one direction;
   second means to connect said shaft to said rotatable means to rotate said rotatable means in the opposite direction;
   and said changing means rendering only one of said first and second means effective and the other of said first and second means ineffective.

3. The apparatus according to claim 1 in which:
   said linear moving means is a band having apertures therein;
   and said rotatable means has means cooperating with said apertures to provide positive driving engagement therewith.

4. The apparatus according to claim 2 in which:
   said linear moving means is a band having apertures therein;
   and said rotatable means has means cooperating with said apertures to provide positive driving engagement therewith.

5. The apparatus according to claim 2 in which:
said changing means includes:
- axially movable means movable in response to the direction of rotation of said rotatable means;
- latching means responsive to the position of said transducer means and cooperating with said axially movable means;
- and pivotally mounted means engaging one of said first and second connecting means to render it effective;
- said axially movable means and said latching means cooperating to change the position of said pivotally mounted means when said transducer means has completed movement in one of its directions.

6. The apparatus according to claim 5 in which:
said axially movable means includes:
- a slider;
- resilient means to cause said slider to be movable in response to rotation of said rotatable means;
- said latching means latching said slider against movement;
- and resilient means connecting said pivotally mounted means to said slider, said last mentioned resilient means having its line of force changed to change the position of said pivotally mounted means when said latching means releases said slider.

7. The apparatus according to claim 5 in which:
each of said first and second connecting means includes:
- ball retaining means;
- and said ball retaining means having balls mounted therein to transmit movement to said rotatable means from said shaft;
- and said pivotally mounted means includes means to engage said ball retaining means of one of said first and second connecting means to lock said ball retaining means against movement to render said connecting means having said locked ball retaining means effective.

8. The apparatus according to claim 5 which:
each of said first and second means includes:
- a member rotating in response to rotation of said shaft;
- said ball retaining means having balls mounted therein to transmit movement to said rotatable means from said rotating member;
- and a spring surrounding said rotating member and said ball retaining means, said spring engaging said rotating member but being normally spaced from said ball retaining means;
- and said pivotally mounted means includes means to cause said spring of one of said first and second connecting means to engage against said ball retaining means to render said one connecting means effective by causing said ball retaining means to rotate with said rotating member and rotate said rotatable means in the same direction as said rotating member.

UNITED STATES PATENT OFFICE
CERTIFICATE OF CORRECTION

Patent No. 3,578,337            Dated    May 11, 1971

Inventor(s)   Walter F. Klein

It is certified that error appears in the above-identified patent and that said Letters Patent are hereby corrected as shown below:

Column 1, line 48, "and" should read -- to --. Column 3, line 72, after "(counterclockwise" insert a parenthesis; line 73, cancel the parenthesis. Column 4, line 62, "The" should start a new paragraph. Column 5, line 28, "Y+" should read -- Y+ --. Column 6, line 46, cancel "motion", second occurrence; line 47, "17" should read -- 71 --; line 66, "6" should read -- 26 --; line 74, "S-" should read -- X- --. Column 7, line 6, "S-" should read -- X- --. Column 9, line 71, "change", second occurrence, should read -- springs --. Column 10, line 34, "Apparatus" should read -- An apparatus --. Column 12, line 12, after the semi-colon, insert as a separate sub-paragraph -- ball retaining means disposed adjacent said rotating member; --.

Signed and sealed this 16th day of May 1972.

(SEAL)
Attest:

EDWARD M. FLETCHER, JR.           ROBERT GOTTSCHALK
Attesting Officer                 Commissioner of Patents